United States Patent [19]
Freedman

[11] 3,743,230
[45] July 3, 1973

[54] VEHICLE SEAT SUSPENSION SYSTEM WITH HEIGHT AND RIDE INDICATOR

[75] Inventor: Gerald Freedman, Evanston, Ill.

[73] Assignee: Freedman Seating Company, Evanston, Ill.

[22] Filed: Dec. 14, 1970

[21] Appl. No.: 97,551

[52] U.S. Cl. .............................. 248/399, 297/309
[51] Int. Cl. .............................................. B60n 1/02
[58] Field of Search ................. 248/399, 400, 401, 248/378, 376, 377, 379; 297/309, 307, 308

[56] References Cited
UNITED STATES PATENTS

| | | | |
|---|---|---|---|
| 3,599,232 | 8/1971 | Tabor | 248/399 |
| 2,562,041 | 7/1951 | Keller | 297/307 |
| 2,829,703 | 4/1958 | Knoedler | 248/400 X |
| 2,936,818 | 5/1960 | Harrington | 248/399 |
| 3,059,890 | 10/1962 | Radke | 248/399 |
| 3,075,736 | 1/1963 | Freedman | 248/400 |
| 3,178,148 | 4/1965 | Manke | 248/399 |
| 3,215,386 | 11/1965 | Swenson | 248/400 |
| 3,268,200 | 8/1966 | Eicher | 248/379 X |
| 3,319,920 | 5/1967 | Freedman | 248/399 |
| 3,325,136 | 6/1967 | Radke | 248/400 |
| 3,519,240 | 7/1970 | Swenson | 248/399 |

Primary Examiner—Francis K. Zugel
Attorney—Alter, Weiss & Whitesel

[57] ABSTRACT

The invention provides improved suspension systems for vehicle seats having a variable height and ride or spring arrangement. An indicator means enables a vehicle operator to preadjust the riding height of the seat and the seat spring suspension rates before he sits in the seat. Also, the system enables the driver to change both the height and the suspension rate while he is in the vehicle, despite any preadjustments which he may have made.

10 Claims, 7 Drawing Figures

Patented July 3, 1973 3,743,230

INVENTOR
GERALD FREEDMAN

BY
Alter, Weiss and Whitesel
ATTORNEYS

INVENTOR
GERALD FREEDMAN

BY
Alter, Weiss and Whitesel
ATTORNEYS

3 Sheets-Sheet 3
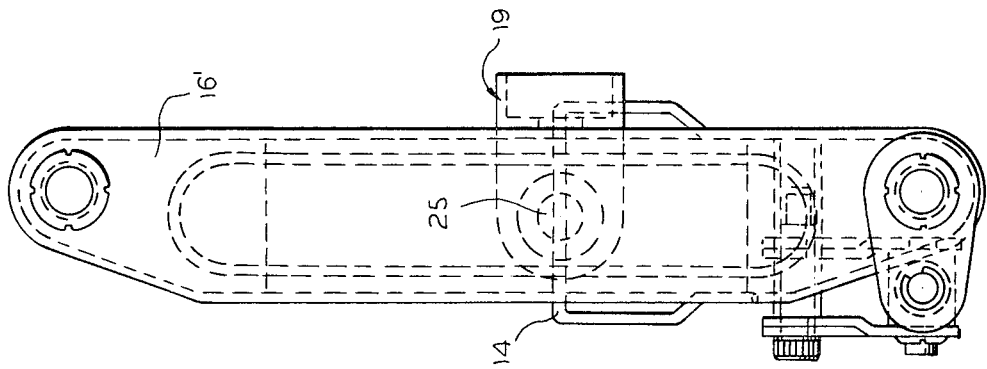
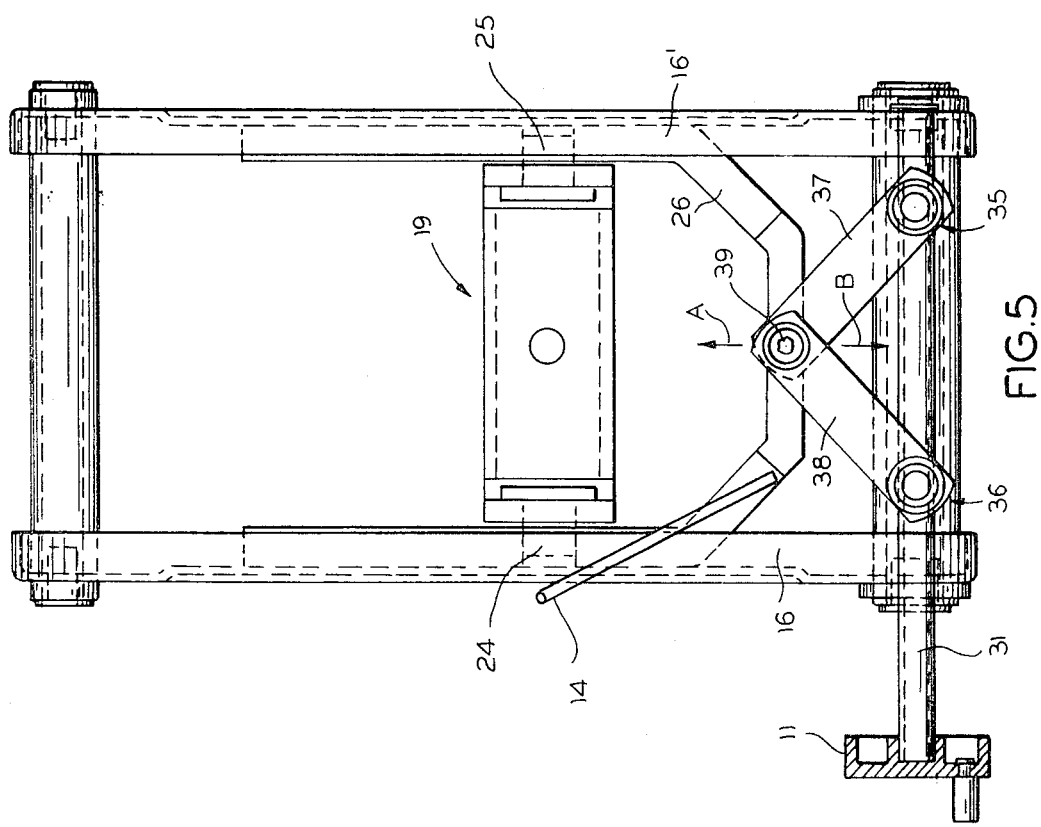
INVENTOR
GERALD FREEDMAN
BY
Alter, Weiss and Whited
ATTORNEYS

VEHICLE SEAT SUSPENSION SYSTEM WITH HEIGHT AND RIDE INDICATOR

This invention relates to improved vehicle seats, and more particularly to suspension systems for use in conjunction with vehicle seats, such as the seats in trucks, buses or other automotive vehicles.

Reference is made to U.S. Pat. No. 3,599,232, patented by Paul C. Tabor and assigned to the assignee of this invention. This invention is an improvement over the device shown in said Tabor patent.

The driver's seats used in vehicles, such as trucks and buses, for example, generally include a suspension system that floatingly supports the seat structure. Usually this suspension system includes springs which absorb some of the vibrations and shocks generated in the moving vehicle, when it is traveling over a road. Thus, the seats are made safer and more comfortable for the vehicle operator.

Prior art suspension systems have included both seat height adjustments and suspension rate adjustments. Thus, the "ride" given by the seat may be adjusted to compensate for the amount of seat deflection under any given load. However, these prior art systems have left much to be desired.

For one thing, certain early seats could not be adjusted by the driver while in the vehicle. Therefore, the driver could not modify the ride unless he first stopped the vehicle and got out of the vehicle. To correct this problem, a number of adjusting knobs, cranks and handles were added to enable the driver to vary the height and ride while he is in the vehicle. However, these adjustments had no indices to give the driver a preliminary idea as to the initial settings of the adjustments. Thus, if a truck were driven on alternate days by a tall, heavy man and a short, light man, it is possible that up to ten or fifteen minutes might be wasted each day by a series of trail and error adjustments of the truck seat.

Another problem which was sometimes encountered related to the clearance provided under the driver's knees and for the driver's feet. Since the supporting structure tended to project forward near the floor, there was less room for the driver to move his heels back under the seat. Also, there was a tendancy for the controls to be collected into the area under the driver's knees. This made it difficult to adjust the seat, especially when the vehicle is in motion.

Still another consideration relates to the decorative appearance of the seat. When an enclosing shroud is placed around some of the previously available seats, there was either an ungainly appearance or many large cutouts for the control knobs, levers, etc.

Accordingly, an object of this invention is to provide a new and improved vehicle seat suspension system for absorbing shocks and vibrations occurring within the moving vehicle.

A related object of the present invention is to provide a seat suspension arrangement with indices which show the relative resiliency of a seat mount before a person sits in the seat. Here, an object is to provide a spring arrangement wherein the existing suspension rate of the seat is indicated throughout an infinite range of rate adjustments extending between certain discrete limits.

A further object of this invention is to vary both the seat height and the spring rate while in the vehicle and without having to change the preloading of the spring. Here an object is to enable a driver to maintain a desired suspension rate of the seat without having to change the riding height of the seat.

In keeping with an aspect of the invention, an automotive seat support includes an upper and a lower stanchion interconnected by a compression spring and associated linkage. If the angle of the spring is changed with respect to a vertical force vector, the softness or firmness of the "ride" quality is also changed, without affecting the seat height. If a preloaded compression of the spring is changed, the height of the seat is changed without changing the "ride" quality. Suitable visual indicators indicate the angle and the preloaded compression of the spring and, therefore, the "ride" and height of the seat.

Thus, the suspension rate and the seat riding height are separately controlled. Before he sits down, the driver knows that the height and rate will be comfortable for his own personal preference. Nevertheless, the means for so controlling the height and rate are conveniently positioned for the driver to make further adjustments while he is sitting in the seat.

The above-mentioned and other features and objects of this invention and the manner of attaining them will become more apparent, and the invention itself will be best understood by reference to the following description of an embodiment of the invention when taken in conjunction with the accompanying drawings, wherein:

FIG. 5 is a top plan view of the lower linkage arms and a rate adjustment device for adjusting the ride qualities;

FIG. 6 is a side elevation view of the linkage shown in FIG. 5; and

FIG. 7 is an exploded view of an eye level adjustment assembly.

Figure 1:
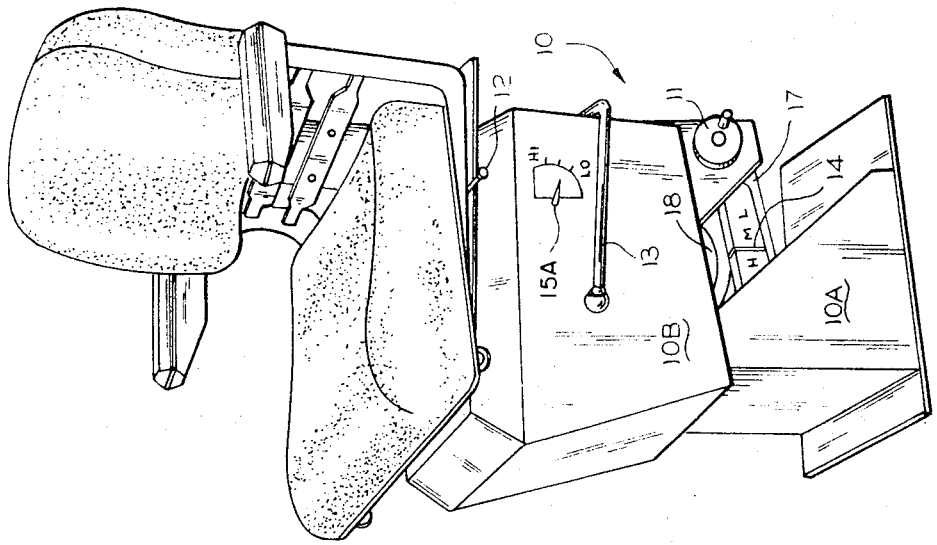
FIG. 1 is a perspective view of the inventive vehicle seat and suspension system.

Similar reference characters indicate corresponding parts and features throughout the various views. More particularly, the improved vehicle seat suspension system 10 (FIG. 1) comprises a lower and an upper stanchion 10A, 10B, respectively. The lower stanchion 10A is bolted to the vehicle floor, and the upper stanchion 10B has the seat bolted thereto. Since the seat represents only one of many similar seats which can be used in vehicles, the term "automotive vehicle" seat is used herein to cover all such seats in a generic manner.

This exemplary, fully adjustable vehicle seat includes a seat cushion, a back cushion, and an adjustable counterbalanced structure 10. The cushions in the seat and back may be molded polyurethane supported by no-sag springs. Any suitable upholstery material, such as vinyl coated fabric or nylon, may cover the cushions.

The adjustable counterbalanced structure 10 includes a suspension assembly with slides having an attached platform floating on a lever assembly which is biased to an elevated position by a compression bias spring. A rotary handle 11 enables the "ride" of the seat to be changed by adjusting the rate of the bias spring to provide a firm or soft ride according to the rider's weight, preference, and road condition. A lever 12 provides a latch control which enables the seat to slide forward, backward, or sideways by suitable amounts. The handle bar 13 provides for and controls an elevation adjustment by preloading the compression spring. An indicator 14 indicates the "ride" qualities selected by the rotary handle 11, and an indicator or pointer 15A indicates the height of the seat selected by the handle bar 13. After the compression spring angle and tension is properly adjusted, the rider floats on a counterbalanced linkage with a desired degree of firmness.

Figure 2:
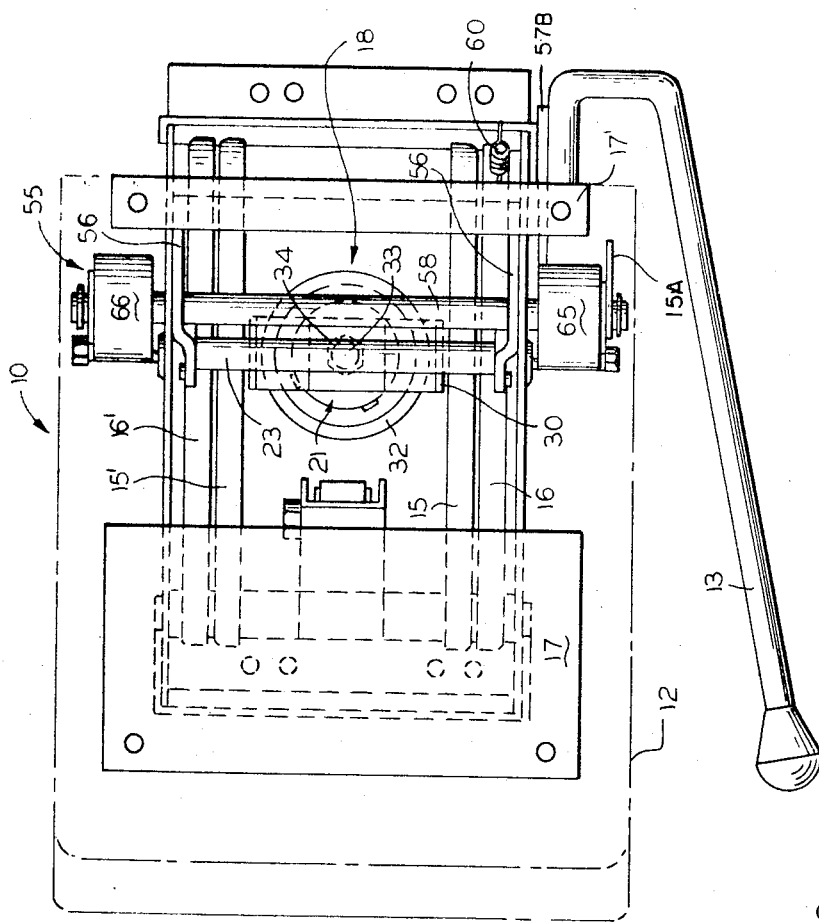
FIG. 2 is a plan view looking down at the top of the suspension system shown in FIG. 1, with the seat removed.
Figure 4:
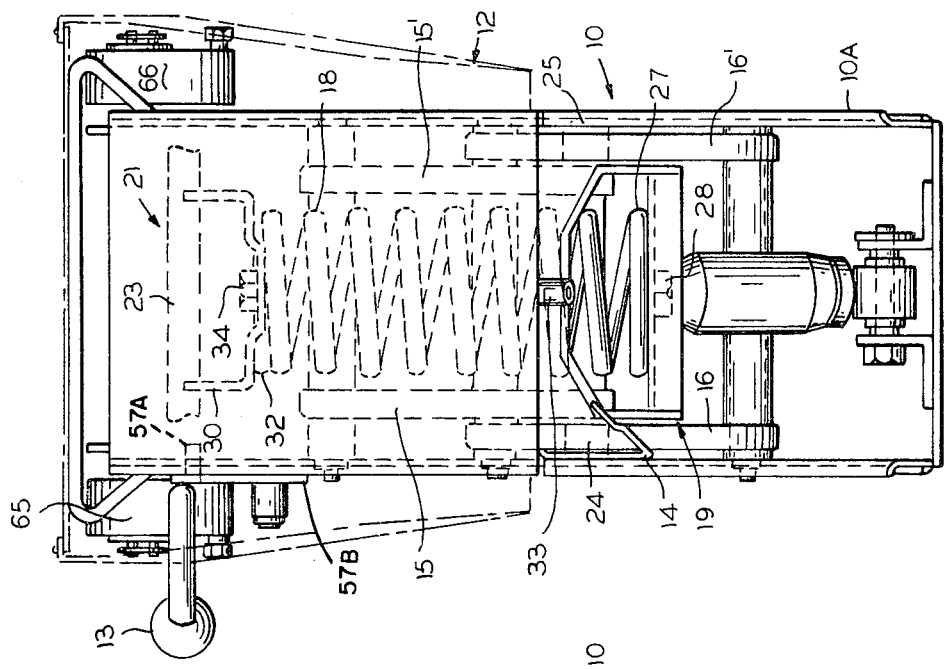
FIG. 4 is a front elevation view of the suspension system of FIG. 1.
Figure 3:
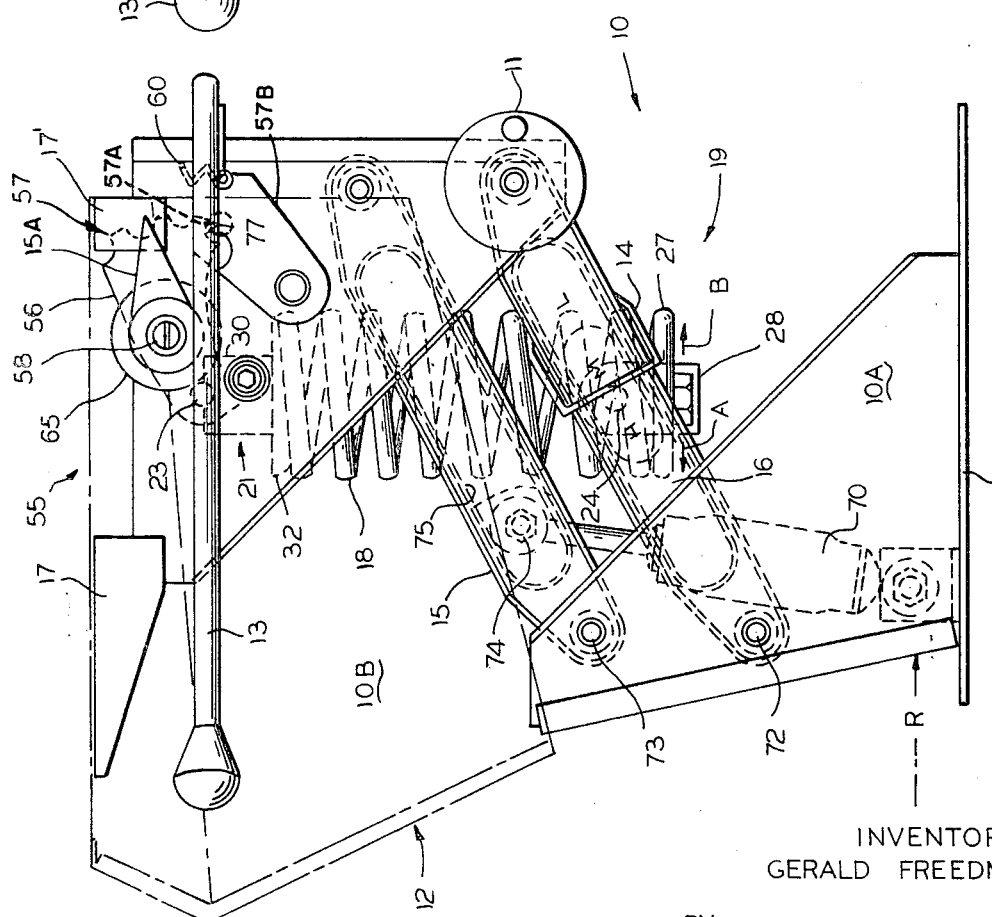
FIG. 3 is a side elevational view of the improved vehicle seat suspension system.

The suspension system assembly of FIGS. 2-4 includes fore and aft seat supporting plate 17, 17', mounted on a linkage 15, 16, and the spring adjustment control system. The linkage comprises an upper and a lower pair of coplanar, spaced apart linkage arms 15, 15' and 16, 16', respectively. These two pairs of linkage arms form a parallelepiped frame in combination with the lower and upper stanchions.

To give the driver a more comfortable ride, resilient means are provided in the form of a compression spring 18 for biasing the suspension system to absorb vibrations generated by the spring vehicle during its motion. Due to the resiliency of this spring means, a given upward force is applied to the seat for causing a unit deflection thereof. The ratio of this force-to-the-unit-deflection is known as the "suspension rate."

The resilient means is compression spring 18 having a lower end mounted in a spring keeper assembly 19, and an upper end attached to a spring plate assembly 21, which in turn is permanently attached to a horizontal eye-level height adjust shaft assembly 23.

The lower spring keeper assembly 19 is pivotally attached at 24, 25 (FIG. 5) to a U-shaped track riding bracket or yoke 26 which provides a means for moving the lower end of the spring 18 along the lower parallel linkage arms 16 and 16' in order to vary the rate of the suspension system. Thus, the linkage arms 16, 16' provide the tracks on which the U-shaped track riding bracket or yoke 26 moves.

As best seen in FIGS. 3 and 4, the spring keeper assembly 19 comprises a spring keeper plate 27, a nut 28, and a bolt for receiving the nut. The keeper plate 27 is shaped to support the end of the spring 18 and hold it against the U-shaped yoke 26. Thus, the bottom end of the spring 18 is free to move along the tracks formed by lower linkage arms 16, 16' to change the angular attitude of spring 18. The spring keeper assembly pivots in the U-shaped yoke 26 as it is moved in the tracks of the lower linkage arms 16 and 16'. A changing of the angular disposition or the attitude of spring 18 changes the suspension rate of the seat since the force vectors applicable to the springs change. Thus, the suspension rate can be changed continuously to an infinite number of settings within the limits of the system.

The upper spring plate assembly 21 comprises an upper spring bracket 30 which is held against the spring by means of an upper spring plate 32, that is fixedly attached to the spring, in conjunction with a suitable fastener, such as a bolt 33 cooperating with a nut 34. Thus, it is seen that bolt 33 runs through the center of the spring to compress it between circular plates 27, 32 welded to upper and lower brackets 30, 19 as the nuts 28 and 34 are tightened on bolt 33.

Means are provided for controlling the "ride" of the seat, and for indicating the apparent firmness thereof. More particularly, a horizontally disposed threaded rod 31 (FIG. 5) turns when rotated by the crank or knob 11 mounted thereon. Two nuts, 35, 36 move in toward the center of the shaft 31 when it is turned one way and move out toward the ends of the shaft when it is turned the other way. A pair of scissor arms 37, 38 move together or apart as the nuts 35, 36 approach or leave each other. This means that the pivot point 39 moves in or out in the directions A or B responsive to the turning of the knob 11. As the point 39 moves in or out, the U-shaped bracket or yoke 26 also moves in the directions A or B. As the yoke moves, spring 18 pivots on trunnions 24, 25 where the spring keeper assembly 19 and yoke 26 are joined.

Mounted on and moving with yoke 26 is the pointer 14 which indicates the amount of yoke travel and therefore the angular attitude of the spring 18. As seen in FIG. 1, pointer 14 is over a scale on the seat which indicates a heavy (H), medium (M), or light (L) ride.

Means are provided for independently adjusting the height of the seat above the floor to assure a comfortable and safe eye level for the vehicle operator. More particularly, as shown in FIG. 3, an eye-level adjustment assembly is provided at 55. Assembly 55 comprises a pair of spaced apart notches brackets, such as bracket 56 with the notches 57 therein.

The eye-level height adjust shaft 23 assembly (FIG. 7) is pivotally attached between the spaced apart and notched brackets 56, at the left-hand ends thereof (as viewed in FIG. 3). This shaft 23 is fixedly attached to upper spring bracket 30. A pivot shaft 58 is fixed to the brackets 56, and journaled to the side walls of the stanchion 10B, thus enabling the assembly 55 to pivot thereabout. The handle bar shaft 13 is fixedly attached on the oppositely disposed sides of the stanchion 10B. A pin 57A on bracket 57B is controlled by the handle bar 13 and arranged to cooperatively mesh with the notches 57 in the bracket plate 56, thus holding the assembly 55 in a fixed vertical position.

Means are provided for holding this notch engaging pin 57A in a normal position. More particularly, the pin bracket spring 60 reaches from an attachment point on the wall of the upper stanchion support member 10B to a catch on the pin bracket 57B controlled by handle bar 13. Thus, the spring 60 holds the pin bracket in a normally raised position so that the pin meshes with one of the notches 57.

When the handle 13 is moved the pin bracket 57B is pushed outwardly against the restoring force of spring 60 to release the bracket assembly and move the pin 57A away from the meshed position in one of the notches 57. Thus, to change the seat height or riding elevation, the handle 13 is moved to release the pin engaging a notch 57 in the plate 56. The driver raises on his feet until he is comfortable. Then he releases the handle bar 13, and the pin 57A engages another notch 57 on the plate 56. The seat is then secure in a different height. According to the invention, this can be done before the driver sits down and while the seat is still empty.

Means are provided for indicating the anticipated seat height before the driver sits down on the seat. In greater detail, the pointer or indicator 15 (FIGS. 1 and 3) is affixed to rotate with the notched plate 56 (FIG. 3) as it turns on the shaft 58. Thus, as the right-hand or notched end of the plate 56 moves upwardly (as viewed in FIG. 3), the pointer or indicator 15A also moves to point in a more upwardly direction. As the right-hand end of the plate 56 moves downwardly, the pointer or indicator 15A swings into a more downwardly pointing position. These positions indicate the pre-loaded spring constant of spring 18, and that constant indicates how far the seat will sink when the driver sits in it. As best seen in FIG. 1, the pointer or indicator indicates the seat height on a suitable scale printed on the side of the seat. Thus, a visual indication enables the seat height to be adjusted so that it returns to a given height position, responsive to the driver's weight, when he sits down.

In greater detail, means are provided for pre-loading the compression spring 18 to vary its spring constant even when the seat supporting unit is in a normally raised and unloaded position (that is, without the driver in the seat). More particularly, in its normal uncompressed condition, the spring 18 is longer than the distance between its two end coupling assemblies 19, 21, at their maximum separation displacement. Thus, when in place, the spring 18 is normally compressed to a pre-loaded condition. In addition, a pair of coiled springs 65, 66 (somewhat similar to a clock's main spring) are wound or unwound by a turning of the shaft 58. These springs act through bracket plate 56 responsive to the winding or unwinding to transmit spring tension forces through shaft 23 which presses downwardly upon the bracket plate 30 to thereby force it downwardly against the compression of the spring 18 and to force it into a further pre-loaded condition. The degree of pre-loading depends upon the rotary angle assumed responsive to the excursion of the notched plate 56. After such an excursion, the shaft 23 pushes downwardly upon spring 18 to change its spring constant by a degree which varies as a function of the rotary excursion. That excursion, in turn, varies according to the notch in plate 56 selected by the driver when he moves and releases the handle bar 13.

Means are provided for limiting the upward travel of seat support unit 10B. More particularly, an anchor means 70 (which may be a hydraulic shock absorber) is attached to the floor 71 and to the upper linkage arms 15, 15' to prevent the arms from rising above a given limit. Thus, the pre-loaded spring 18 forces the upper stanchion 10B to move upwardly by exerting a vertical lifting force through the right-hand end (as viewed in FIG. 3) of the linkage arms 15, 16 attached between stanchions 10A, 10B. As the seat raises, the linkage arms 15, 16 rotate about the pivot pins between 72, 73 which attach them to the lower stanchion 10A. The upward travel of these linkage arms is limited by anchor means 70 as its upper end travels by riding in the slot 75. Thus, at the maximum height, the seat is retained at a predetermined unloaded raised position.

The riding height of the seat varies as a function of the preloading compression acting upon the spring 18. Thus, when the pin controlled by handle bar 13 is in the lowermost notch 77 of the plate 56, the assembly bar 23 pushes downwardly with a maximum force, and the spring 18 is compressed to its maximum pre-loaded condition. In this condition, the deflection caused by the driver's weight is minimized, and the riding height is maximized. When the plate 56 is moved to have the pin controlled by the handle bar 13 in the highest notch 78, the spring 18 has its minimum preload, and the riding height caused by the driver's weight is minimum.

Therefore, upon reflection, it should be apparent that the degree of spring pre-loading indicated by the pointer or indicator 15A represents the height of the seat when it is pressed down under the driver's weight. Once the handle bar 13 is released, both the spring pre-load, and the position of the pointer, remains fixed relative to the seat stanchion 10B. Hence, the position of the pointer is the same, for the same spring pre-stress, relative to the seat stanchion 10B (i.e., seat height) regardless of whether the driver is or is not in the seat when the adjustment is made.

To lower the seat height, the driver merely has to push down on handle bar 13, exert a force downward on the seat, and allow the handle bar to return to its normal position, whereupon the pin fits into one of the notches 57 (such as notch 78). When this occurs, the shaft assembly 23 exerts more or less of a downward force on compression spring 18 and it has a greater or smaller pre-load thereon. Thus, the seat deflects a different amount under the weight of the driver, so that the riding height is decreased.

The anchor 70, a well known hydraulic shock absorber, or the like, damps the vibration of the suspension system.

In addition to the above described visual displays of the height and ride qualities, the invention also provides a number of other improvements. Thus, there is a maximum heel room R under the seat. The space between the driver's knees and the floor is completely free of all knobs, controls or other protrusions. A shroud completely encloses the linkage, spring, and support equipment, thereby keeping this equipment clean and free of debris which may fall from the seat. The back plate of stanchion 10B also protects the equipment from debris which might otherwise fall behind the seat.

Other and further modifications may readily occur to those who are skilled in the art. Therefore, the appended claims are to be construed to cover all equivalent structures which may fall within the spirit and the scope of the invention.

I claim

1. An automotive seat comprising an upper and a lower stanchion member interconnected for vertical motion by a linkage and an elongated resilient means movably supported by said linkage, means associated with one end of said resilient means and said movable support for adjustably fixing the angular displacement of said means, means associated with the other end of said resilient means for adjustably preloading said resilient means for fixing the resilience of said means, means for separately and independently adjusting the movable support and the preloading means at the two ends of said resilient means to change the angular displacement and the resilience of said resilient means, thereby separately and independently adjusting the height and ride qualities of said seat, and means responsive to said separate and independent adjustments at said two ends for separately and independently indicating the height and ride qualities of said seat.

2. The automotive seat of claim 1 wherein said linkage comprises upper and lower spaced parallel arms pivotally attached to and extending between said upper and lower stanchions, and said resilient means extends at a predetermined angle between at least one of said arms and the upper stanchion, and means for varying the angle to thereby vary said ride qualities, one of said indicating means being coupled to read out the angle of said resilient means.

3. The automotive seat of claim 2 wherein said resilient means is a compression spring mounted for travel along said arm to vary said angle, and said one indicator comprises a pointer means moving as a function of said travel.

4. The automotive seat of claim 3 wherein said one arm and another arm spaced parallel therefrom form tracks, said movable support for said resilient means comprising a yoke means moving along tracks formed by said arms, one end of said compression spring being attached to and riding on said yoke for changing said angular displacement, and said one indicator means comprises a pointer coupled to move with said yoke.

5. The automotive seat of claim 4 and means comprising a threaded rod extending perpendicularly across said tracks with a control handle at the end of said rod for rotating it, scissor linkage means for positioning the movable yoke means in said tracks, said scissor linkage being attached to threaded nuts which move together or apart as said threaded rod is turned, and means for moving said yoke and said angular displacement of said resilient means responsive to the movement of said scissor linkage.

6. The automotive seat of claim 1 wherein said linkage comprises upper and lower spaced parallel arms pivotally attached to and extending between said upper and lower stanchions, and said resilient means extends between at least one of said arms and the upper stanchion, means for pre-loading said resilient means to alter the deflection thereof under weight, and means responsive to said pre-loading for indicating the height of said seat.

7. The automotive seat of claim 6 wherein said resilient means comprises a compression spring, adjustable means including at least one other spring for pushing down upon and pre-loading said compression spring by a selected amount, and said seat height indicator comprising means movable responsive to said adjustable means.

8. An automotive seat comprising means including a first stanchion for attachment to an auto floor, means including a second stanchion floatingly mounted above said first stanchion, said floating mount comprising a plurality of linkage arms formed into a pivotally interconnected parallelepiped frame which enables said second stanchion to move between positions which are above and behind said first stanchion, means comprising a threaded rod extending parallel to the pivotal interconnections of said parallelepiped frame with a control handle at the end of said rod for rotating it, scissors linkage means attached to threaded nuts riding on said threaded rods, said nuts moving together or apart as said threaded rod is turned, compression spring means interconnected between said parallelepiped frame and said second stanchion, said compression spring means comprising two opposing springs angularly disposed with respect to said linkage arms, one of said springs being an elongated member having an angular displacement with respect to said parallelepiped frame, means for changing said angular displacement responsive to the movement of said scissors linkage, means associated with one of said springs for movement of said one spring relative to the other spring whereby the opposition of said springs is varied, and indicator means for indicating the opposing relationship of the two springs whereby a first indicator indicates the eye level of an occupant of the seat, and a second indicator indicates the amount of said angular movement of said one spring means, thereby indicating the ride quality of the seat.

9. The seat of claim 8 wherein said first and second stanchions are shaped to recede from the edge of a seat cushion positioned on said second stantion back under said seat to provide heel room for a person sitting on said cushion.

10. The seat of claim 8 wherein said second indicator means comprises one pointer moved responsive to movement of said scissors means for indicating the angle between at least one of said arms and said first indicator comprises a second pointer for indicating a preloading on said spring caused by the opposition of said springs.

* * * * *